United States Patent
Mordechai

(10) Patent No.: US 11,808,859 B2
(45) Date of Patent: Nov. 7, 2023

(54) SYSTEM AND METHOD OF DEPTH IMAGING BASED ON ROLLING SHUTTER CMOS IMAGE SENSOR AND DOWN CONVERSION TECHNIQUES

(71) Applicant: GM Global Technology Operations LLC, Detroit, MI (US)

(72) Inventor: Emanuel Mordechai, Mishmarot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 17/117,178

(22) Filed: Dec. 10, 2020

(65) Prior Publication Data
US 2022/0187466 A1   Jun. 16, 2022

(51) Int. Cl.
G01S 17/93    (2020.01)
G01S 17/931   (2020.01)
G01S 7/4913   (2020.01)

(52) U.S. Cl.
CPC .......... *G01S 17/931* (2020.01); *G01S 7/4913* (2013.01)

(58) Field of Classification Search
None
See application file for complete search history.

(56) References Cited

U.S. PATENT DOCUMENTS

2021/0109223 A1* 4/2021 Atalar .................. G01S 7/4915

OTHER PUBLICATIONS

Atalar, et al., "Time-of-flight imaging based on resonant photoelastic modulation", Publication Date Mar. 15, 2019, The Optical Society (OSA), Journal: Applied Optics, 15 Pages. DOI: https://doi.org/10.1364/AO.58.002235.

* cited by examiner

*Primary Examiner* — Hovhannes Baghdasaryan
(74) *Attorney, Agent, or Firm* — CANTOR COLBURN LLP

(57) ABSTRACT

A vehicle, imaging system and method of determining a range of an object to a vehicle. The imaging system includes a light source, a receiver and a processor. The light source is configured to transmit a source signal at a source frequency at an object, wherein the source signal is reflected from the object to create a reflected signal. The receiver includes a sensor array and is configured to modulate the reflected signal at a mixing frequency to generate a down-converted signal and record the down-converted signal at the sensor array. The processor is configured to determine a range of the object to the vehicle using the down-converted signal.

17 Claims, 9 Drawing Sheets

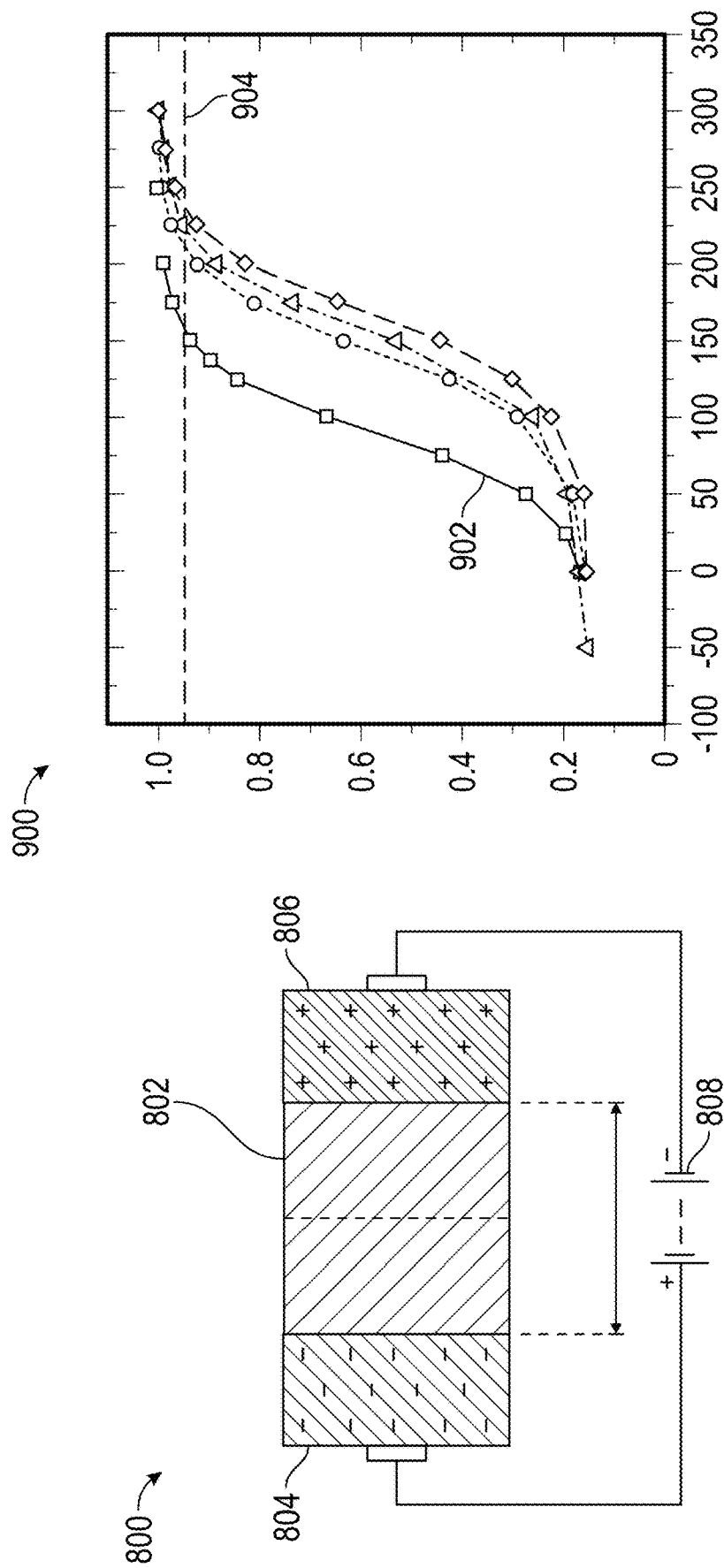

SYSTEM AND METHOD OF DEPTH IMAGING BASED ON ROLLING SHUTTER CMOS IMAGE SENSOR AND DOWN CONVERSION TECHNIQUES

INTRODUCTION

The subject disclosure relates to imaging systems and, in particular, to a system and method of depth imaging using signal down-conversion.

Depth imaging is useful in various fields, such as for determining a location of an object within an environment being traversed by a vehicle. One method of depth imaging includes indirect time-of-flight imaging. In indirect time-of-flight imaging, a scene is illuminated with an amplitude modulated continuous wave (AMCW) source signal and a phase difference between the source signal and a reflected signal is measured. Typically, the AMCW source signal has a frequency in the Megahertz range. Standard image sensors are bandwidth limited when capturing the phase of such high frequency signals. Accordingly, it is desirable to use a signal processing technique to capture information at high frequencies using standard image sensors.

SUMMARY

In one exemplary embodiment, a method of determining a range of an object at a vehicle is disclosed. A source signal is transmitted from the vehicle at a source frequency at the object, wherein the source signal is reflected from the object to create a reflected signal. The reflected signal is modulated using a mixing frequency to form a down-converted signal. The down-converted signal is recorded at a sensor array of the vehicle. The range of the object to the vehicle is determined using the down-converted signal.

In addition to one or more of the features described herein, modulating the reflected signal includes modulating an intensity of the reflected signal at the mixing frequency using a modulator between the object and the sensor array, in one embodiment. In another embodiment, modulating the reflected signal includes modulating a quantum efficiency of the sensor array at the mixing frequency. The down-converted signal is recorded at a pixel cell comprising four rows, each row having four pixels. The four pixels of each of the four rows are binned to obtain four binned pixels, each binned pixel having a row signal amplitude and a time stamp. The method further includes determining at least one of a phase of the reflected signal from the row signal amplitudes and an amplitude or magnitude of the reflected signal from the row signal amplitudes. The method further includes determining a time-of-flight of the reflected signal and a range to the object from the time-of-flight.

In another exemplary embodiment, an imaging system of a vehicle is disclosed. The imaging system includes a light source, a receiver and a processor. The light source is configured to transmit a source signal at a source frequency at an object, wherein the source signal is reflected from the object to create a reflected signal. The receiver includes a sensor array and is configured to modulate the reflected signal at a mixing frequency to generate a down-converted signal and record the down-converted signal at the sensor array. The processor is configured to determine a range of the object to the vehicle using the down-converted signal.

In addition to one or more of the features described herein, the imaging system further includes a modulator configured to modulate an intensity of the reflected signal at the mixing frequency to generate the down-converted signal. In another embodiment, a quantum efficiency of the sensor array is adjusted at the mixing frequency to generate the down-converted signal. The processor is further configured to generate a pixel cell comprising four rows, each row having four pixels, and record the down-converted signal using the pixel cell. The processor is further configured to bin the four pixels of each of the four rows to obtain four binned pixels, each binned pixel having a row signal amplitude and a time stamp. The processor is further configured to determine at least one of a phase of the reflected signal from the row signal amplitudes and an amplitude of the reflected signal from the row signal amplitudes. The processor is further configured to determine a time-of-flight of the down-converted signal and a range to the object from the time-of-flight.

In yet another exemplary embodiment, a vehicle is disclosed. The vehicle includes a light source, a receiver and a processor. The light source is configured to transmit a source signal at a source frequency at an object, wherein the source signal is reflected from the object to create a reflected signal. The receiver includes a sensor array and is configured to modulate the reflected signal at a mixing frequency to generate a down-converted signal and record the down-converted signal at the sensor array. The processor is configured to determine a range of the object using the down-converted signal.

In addition to one or more of the features described herein, a modulator is configured to modulate an intensity of the reflected signal at the mixing frequency to generate the down-converted signal. In another embodiment, a quantum efficiency of the sensor array is adjusted at the mixing frequency to generate the down-converted signal. The processor is further configured to generate a pixel cell comprising four rows, each row having four pixels, and record the down-converted signal using the pixel cell. The processor is further configured to bin the four pixels of each of the four rows to obtain four binned pixels, each binned pixel having a row signal amplitude and a time stamp. The processor is further configured to determine at least one of a phase of the reflected signal from the row signal amplitudes and an amplitude of the reflected signal from the row signal amplitudes.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 8 shows a pixel of a modulated sensor array of the alternate imaging system, in an embodiment;

FIG. 9 shows a graph of quantum efficiency for PN junctions having different doping concentrations.

DETAILED DESCRIPTION

Figure 1:
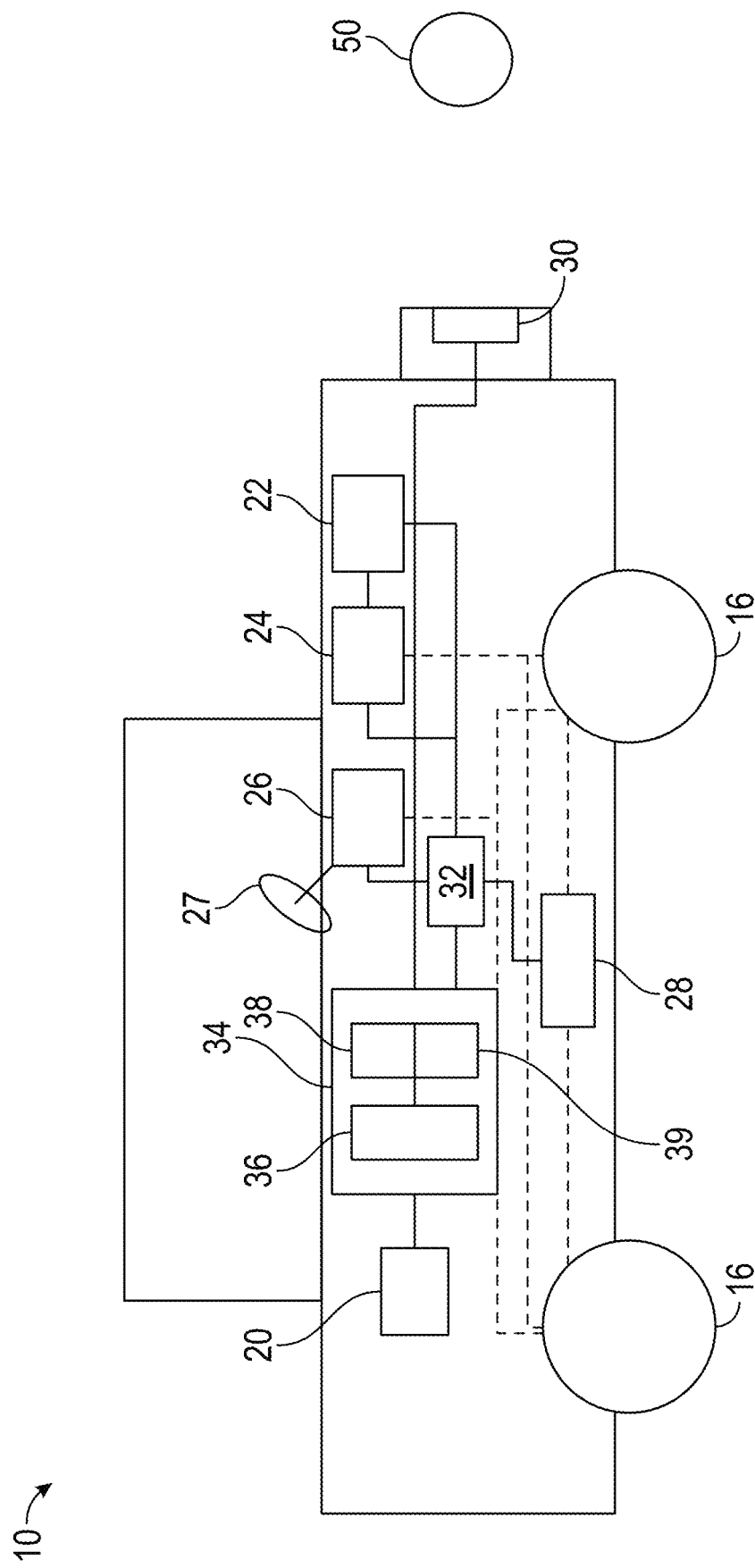
FIG. 1 shows an autonomous vehicle in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of the Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 senses an object 50 in an exterior environment of the autonomous vehicle 10 and determines parameters such as a position and/or velocity of the object 50 with respect to the autonomous vehicle 10. Such parameters can be provided to the controller 34 for navigational purposes. Operation of the sensor system 30 is discussed with respect to FIG. 2, in an embodiment. The sensor system 30 includes additional sensors, such as digital cameras, for identifying road features, etc.

The controller 34 builds a trajectory for the autonomous vehicle 10 based on the output of sensor system 30. The controller 34 can provide the trajectory to the actuator system 32 to control the propulsion system 22, transmission system 24, steering system 26, and/or brake system 28 in order to navigate the autonomous vehicle 10 with respect to the object 50.

The controller 34 includes a processor 36 and a computer readable storage device or storage medium 38. The computer readable storage medium includes programs or instructions 39 that, when executed by the processor 36, operate the autonomous vehicle based on sensor system outputs. The storage medium 38 may further include programs or instructions 39 that when executed by the processor 36, determines a state of object 50 in order to allow the autonomous vehicle to navigate with respect the object.

Figure 2:
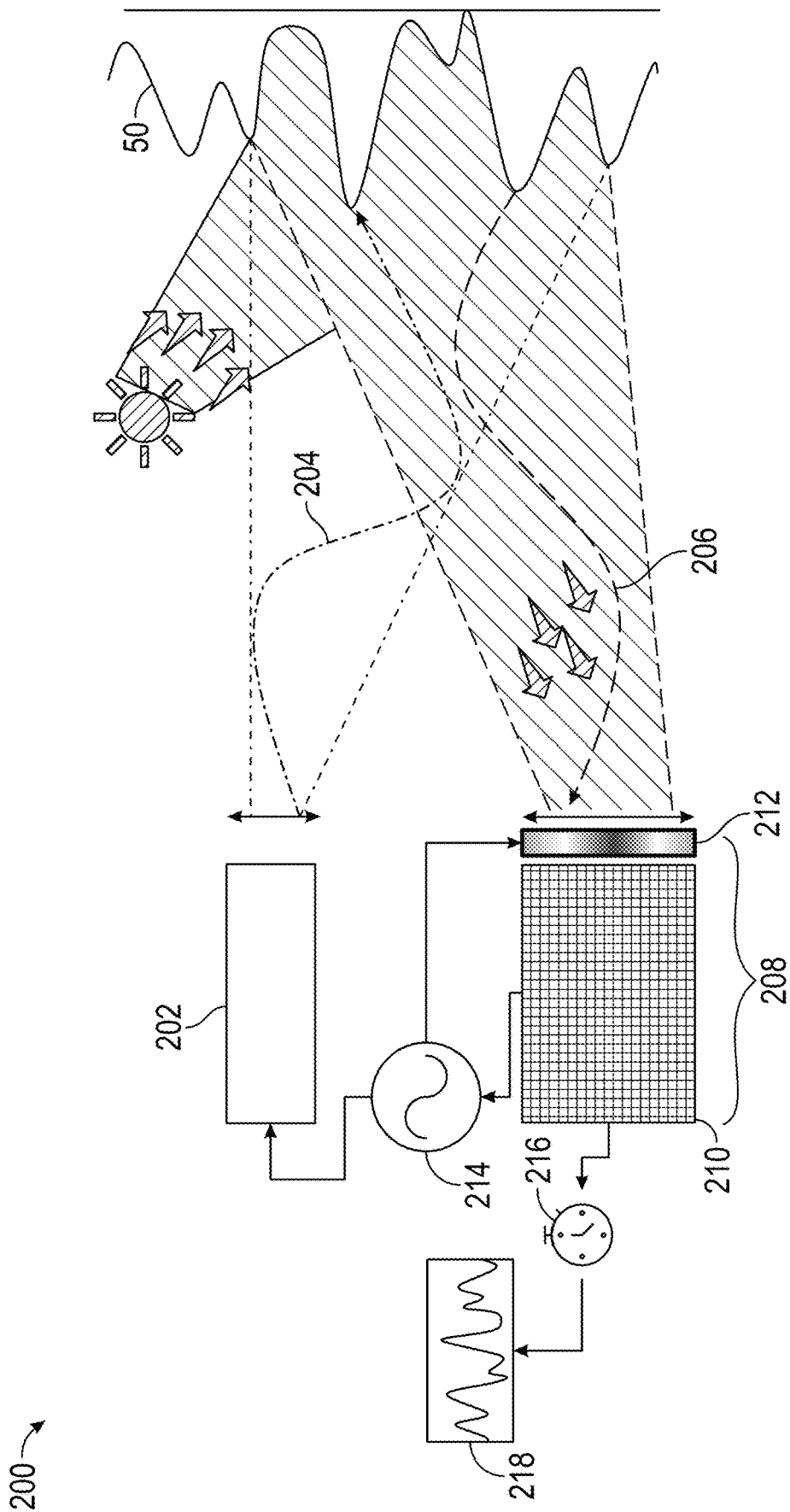
FIG. 2 shows a schematic diagram of a depth imaging system of the vehicle, in an embodiment.

FIG. 2 shows a schematic diagram of a depth imaging system 200 in an embodiment. The depth imaging system 200 includes a light source 202 and a receiver 208. The light source 202 can be an amplitude modulated continuous wave (AMCW) light source that generates an AMCW source signal 204 and transmits the AMCW source signal 204 at an object 50. In various embodiments, the frequency of the AMCW source signal 204 is in the Megahertz frequency range. The AMCW source signal 204 is reflected from an object 50 within the scene to generate a reflected signal 206. The reflected signal 206 is received at the receiver 208.

In an embodiment, the receiver 208 is a digital camera including a sensor array 210 located in an imaging plane of the digital camera and a shutter or modulator 212 in front of the sensor array 210. The sensor array 210 includes an array of pixels that generate a voltage in direct proportion to an amount of light incident on the pixel. The modulator 212 is modulated between a high-transmissivity state and a low-transmissivity state at a selected mixing frequency. The reflected signal 206 passes through the modulator 212. The modulator 212 modulates the reflected signal 206 to create a mixed signal. The mixed signal is received at the sensor array 210. In various embodiments, the modulator 212 down-converts a frequency of the reflected signal 206 to generate the mixed signal. The mixed signal is therefore a down-converted signal.

A system controller 214 synchronizes operation of the light source 202, receiver 208 and modulator 212, allowing the mixed signal received at the receiver 208 to be compared to the source signal 204. A signal processor 216 reads voltage values at the pixels of the sensor array 210 and determines from these voltage values phase and amplitude values of the mixed signal. An image processor 218 then determines a depth and/or image of the object 50, giving a three-dimensional image of the object.

Figure 3:
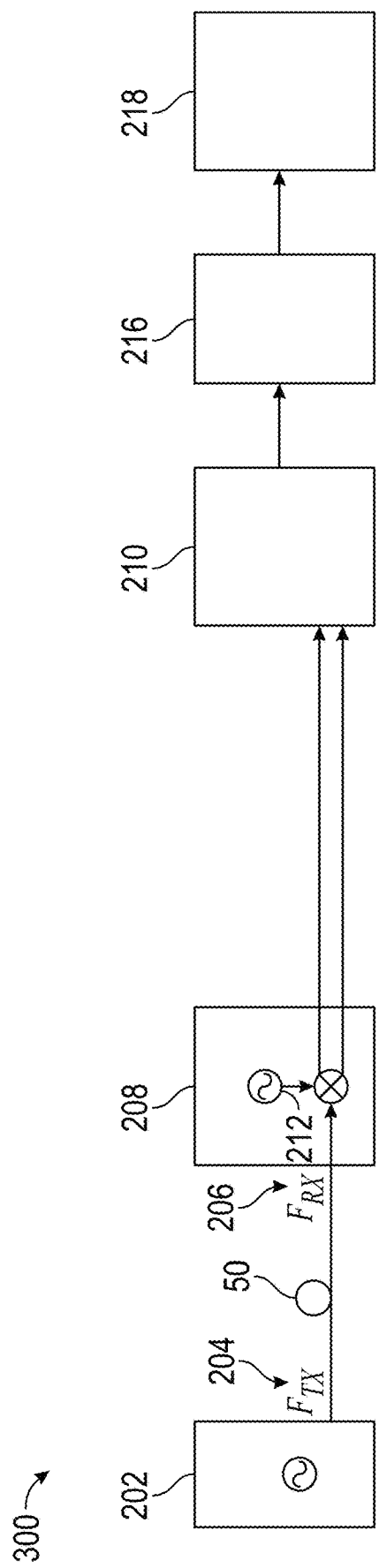
FIG. 3 shows a block diagram illustrating operation of the depth imaging system, in an embodiment.

FIG. 3 shows a block diagram 300 illustrating operation of the depth imaging system 200, in an embodiment. The block diagram 300 includes the light source 202, receiver 208, modulator 212, sensor array 210, signal processor 216 and image processor 218.

The light source 202 generates the source signal 204 at a source frequency $f_s$. The source signal 204 has a waveform $F_{TX}$ as indicated in Eq. (1):

$$F_{TX} = P \cdot [\cos(2\pi f_s t - \phi_0) + 1] \qquad \text{Eq. (1)}$$

where P is the original power of the source signal 204, $f_s$ is the frequency of the source signal, and $\phi_0$ is the original phase of the source signal. A reflected signal 206 created by reflection of the source signal 204 from the environment or object 50 is incident at the receiver 208. The sensor array 210 of the receiver 208 forms a two-dimensional array of pixels having a dimension of N×M, where N is the number of rows and M is the number of columns. The reflected light received at a pixel (n, m) of the sensor array 210 is received with a time delay $t_d^{n,m}$. Thus, for a selected pixel (n, m), the reflected signal 206 received at the pixel has a waveform $F_{RX}^{n,m}$ in given by Eq. (2):

$$F_{RX}^{n,m} = A_{n,m} \cdot [\cos(2\pi f_s(t - t_d^{n,m}) - \phi_0) + B_{n,m}] \qquad \text{Eq. (2)}$$

where $B_{n,m}$ is an amplitude of an oscillation of the reflected signal 206 at the receiver 208 and $B_{n,m}$ is related to an average power of the reflected signal 206. The modulator 212 modulates the reflected signal 206 using a mixing signal which has a waveform $F_{MIX}$ indicated in Eq. (3):

$$F_{MIX} = \tfrac{1}{2} \cdot [\cos(2\pi f_{MIX} t) + 1] \qquad \text{Eq. (3)}$$

where $f_{MIX}$ is the frequency of modulation of the modulator 212. The mixing frequency $f_{MIX}$ is selected to be close to the frequency of the source signal $f_s$, both of which are in the Megahertz range. The difference $\Delta f$ between the mixing frequency and the frequency of the source signal is given by Eq. (4):

$$f_{MIX} = f_s - \Delta f \qquad \text{Eq. (4)}$$

and is generally in the range of kilohertz. The modulation of the reflected signal 206 using the modulator 212 generates a down-converted signal or a signal having a lower frequency. The main component of the down-converted mixed signal $F_{IN}$ received at the sensor array 210 is shown in Eq. (5):

$$F_{IN}^{n,m} = \frac{A_{n,m}}{4} \cdot \cos(2\pi \Delta f t - \phi_d^{n,m} - \phi_0) \qquad \text{Eq. (5)}$$

Information about the object is held in the various parameters of the waveform recorded at the sensor array 210. For example, the phase term $\phi_d^{n,m}$ holds information about a depth of the object and intensity measurements at the pixel (n, m) help determined reflectance of the object.

Figure 4:
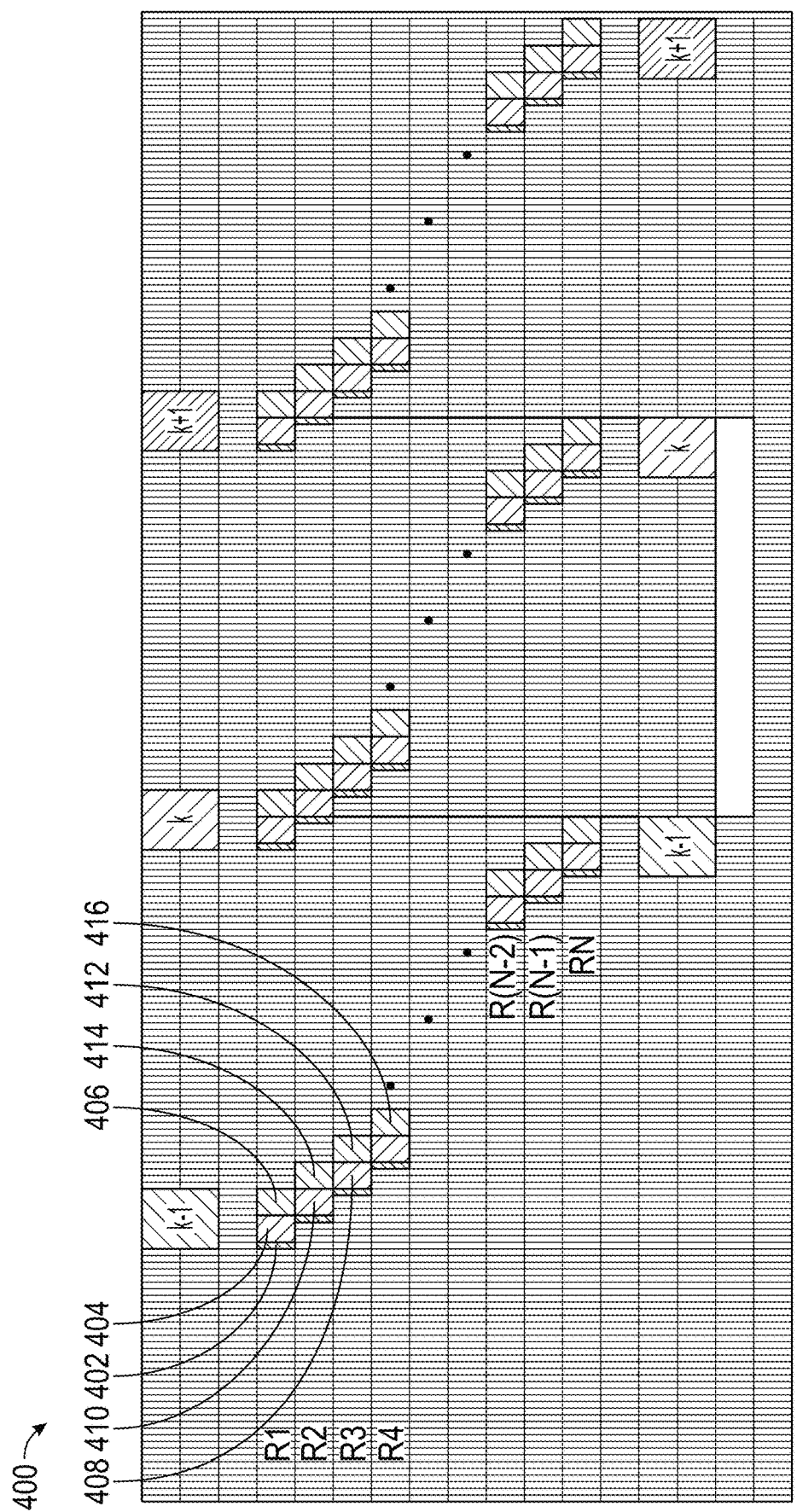
FIG. 4 illustrates an operation of a signal processor of the depth imaging system.

FIG. 4 illustrates an operation of the signal processor 216. A time chart 400 shows relative times at which pixels of the sensor array 210 are read by the signal processor 216, in an embodiment. Pixel rows are shown along the y-axis with time shown along the x-axis. N pixel rows are shown with the first row (i.e., R1 at the top and the last row (i.e., RN) at the bottom.

For a selected row, (e.g., R1) a measurement time period for the row or pixels includes a reset period 402, an integration period 404 and a readout period 406. In the reset period 402, the pixel values are reset to an initialized value from their previous value. During the integration period 404, the pixel is receptive to light and accumulates a voltage value at the pixel indicative of light intensity at the pixel. During the readout period 406, the voltage at the pixel is read to a processor. Each row can have a timestamp associated with the measurement time period, or more specifically, the readout period 406.

Observing the time chart 400, the pixel measurement time period for a selected row is offset in time by an amount that prevents overlap of read out periods of adjacent rows. In one embodiment, the duration of the integration period $T_{INT}$ for a row is set to the same duration as the readout period $T_{RO}$ for the row. Additionally, the integration periods and the readout periods for all rows are the same. The integration period 408 for a selected row (e.g., R3) is synchronized with the integration period 410 of the previous row (e.g., R2) such that the integration period 408 of the selected row begins when the integration period 410 of the previous row ends. If the selected row is the first pixel row (e.g., R1), then the integration period is synchronized to the integration period of the last pixel row (e.g., RN). As illustrated by the time chart 400, with this synchronization of integration periods, the readout period 412 of a selected row (e.g., R3) does not overlap either the readout period 414 of the previous row (e.g., R2) or the readout period 416 of the subsequent row (e.g., Row 4).

The time chart 400 is separated into a plurality of time frames ( ... Frame (k-1), Frame (k), Frame (k+1) ... ). Each time frame lasts for a duration of time that allows each row (R1, . . . , RN) to be read once. Since rows are read sequentially, the duration of a time frame lasts from the time at which the readout of the first row (R1) is commenced to the time at which readout of the last row (RN) is completed. The duration of a time frame $T_{INT}$ is therefore equal to the number of pixel rows times the readout time for each row, as shown in Eq. (6):

$$T_{INT} = N_{ROWS} \cdot T_{RO} \qquad \text{Eq. (6)}$$

where $N_{ROWS}$ is the number of rows and $T_{RO}$ is the readout time.

Figure 5:
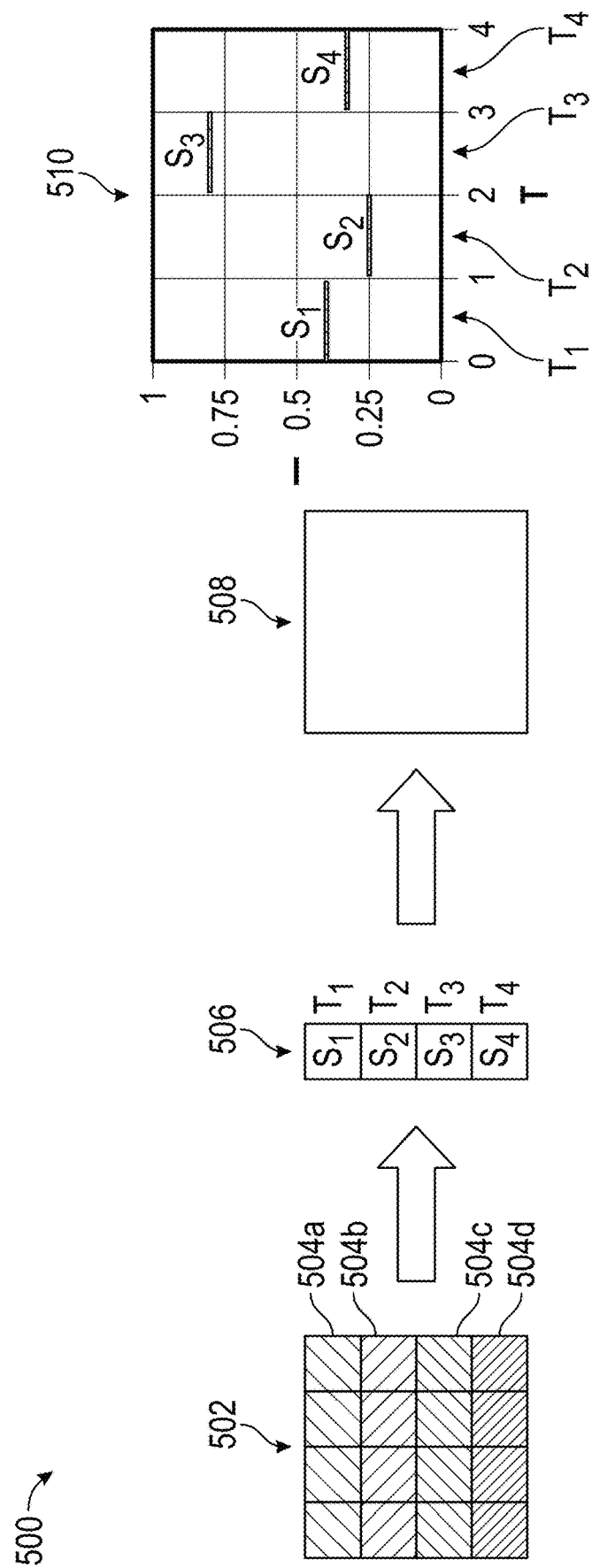
FIG. 5 illustrates a use of a pixel cell to process pixels for determining depth and intensity information from pixel measurements.

FIG. 5 illustrates a use of a pixel cell to process pixels for determining depth and intensity information from pixel measurements. A pixel cell 502 is defined having a selected dimension. In various embodiments, a pixel cell 502 is a 4×4 cell (i.e, four rows (504a, 504b, 504c, 504d), each row having 4 pixels). The pixel cell 502 acts as a window moving from pixel to pixel of the image sensor. The pixel cell 502 accumulates information from the pixel rows in a sequence to generate a lock-in pixel 508. Due to the size of the 4×4 pixel cell 502, three rows and three columns at the edges of the image sensor are neglected. Thus, an image sensor having an N×M array of pixels, produces a an (N−3)×(M−3) array of lock-in pixels.

Each of the rows (504a, 504b, 504c, 504d) of the pixel cell 502 has an associated time stamp. The time stamp can be a time at which the readout period begins, a time at which the readout period ends, or any other time representative of the readout period, in various embodiments.

To process the pixel cell 502, each of the rows (504a, 504b, 504c, 504d) of the pixel cell 502 is binned to obtain a row signal, thereby producing four row signals $S_i$ (i=1, . . . , 4), with each row signal having an associated time stamp. The row signal $S_i$ can be a summation of pixel voltage values of an average of these values, in various embodiments. The row signals 506 and time stamps are then associated to a lock-in pixel 508.

Graph 510 shows a relation between row signals $S_i$ and timestamp $T_i$. Time is shown along the abscissa and signal intensity is shown along the ordinate axis. Four time periods ($T_1$, $T_2$, $T_3$, $T_4$) are shown, each time period representing a readout period for the row. Row signal amplitudes ($S_1$, $S_2$, $S_3$, $S_4$) are shown within their respective readout periods. These row signal amplitudes can be used to determined depth and intensity information of the object, as discussed with respect to FIG. 6.

Figure 6:
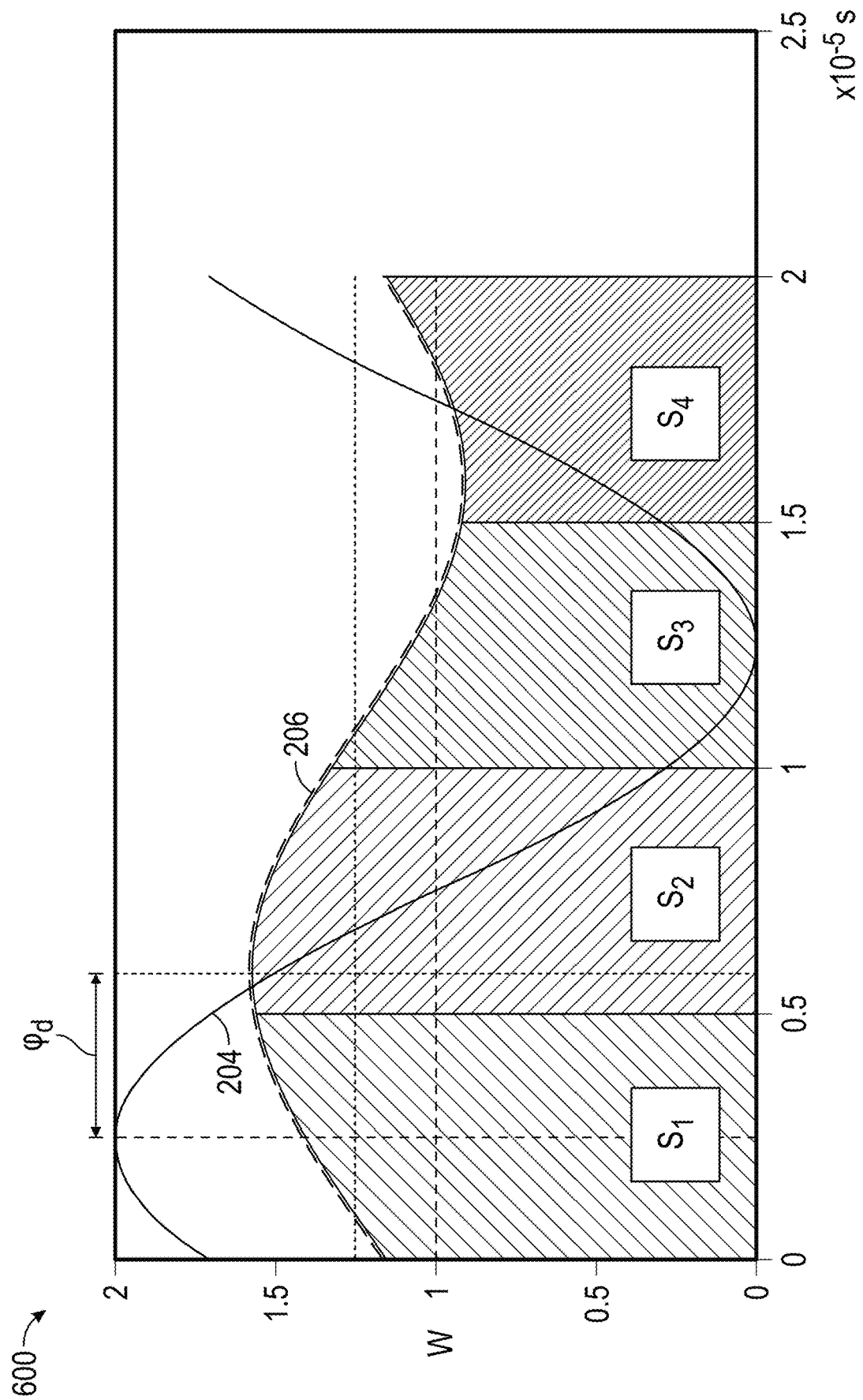
FIG. 6 illustrates operation of an image processor of the depth imaging system.

FIG. 6 illustrates operation of the image processor 218. Graph 600 shows both the source signal 204 and a reconstruction of the reflected signal 206. Time is shown in $10^{-5}$ seconds along the abscissa and optimal power is shown in Watts (W) along the ordinate axis. The image processor 218 reconstructs the waveform of the reflected signal 206 from the row signals $S_i$ shown in graph 510. The phase of the reflected signal 206 can be determined from the row signal amplitudes $S_i$ using Eq. (7):

$$\phi_d = \tan^{-1}\left(\frac{S_1 - S_3}{S_2 - S_4}\right) \qquad \text{Eq. (7)}$$

The time of flight $t_d$ for between the transmission of the source signal 204 and reception of the reflected signal 206 is related to the phase $\phi_d$, as shown in Eq. (8):

$$2\pi f t_d = \phi_d \qquad \text{Eq. (8)}$$

The range of the object can then be determined using Eq. (9):

$$R = \left(\frac{\phi_d}{2\pi}\right) \cdot R_{MAX} \quad \text{Eq. (9)}$$

Where the maximum range is determined by Eq. (10):

$$R_{MAX} = \frac{c}{2f} \quad \text{Eq. (10)}$$

The amplitude of the reflected signal 206 can be determined from the row signal amplitudes $S_i$, as shown in Eq. (11):

$$A = \left[\frac{(S_1 - S_3)^2 + (S_2 - S_4)^2}{4}\right]^{1/2} \quad \text{Eq. (11)}$$

The average power of the reflected signal is given by Eq. (12):

$$B = \frac{1}{4}\sum_{i=1}^{4} \frac{S_i}{\Delta t} \quad \text{Eq. (12)}$$

where $\Delta t$ is the readout time for a row of the pixel cell.

Figure 7:
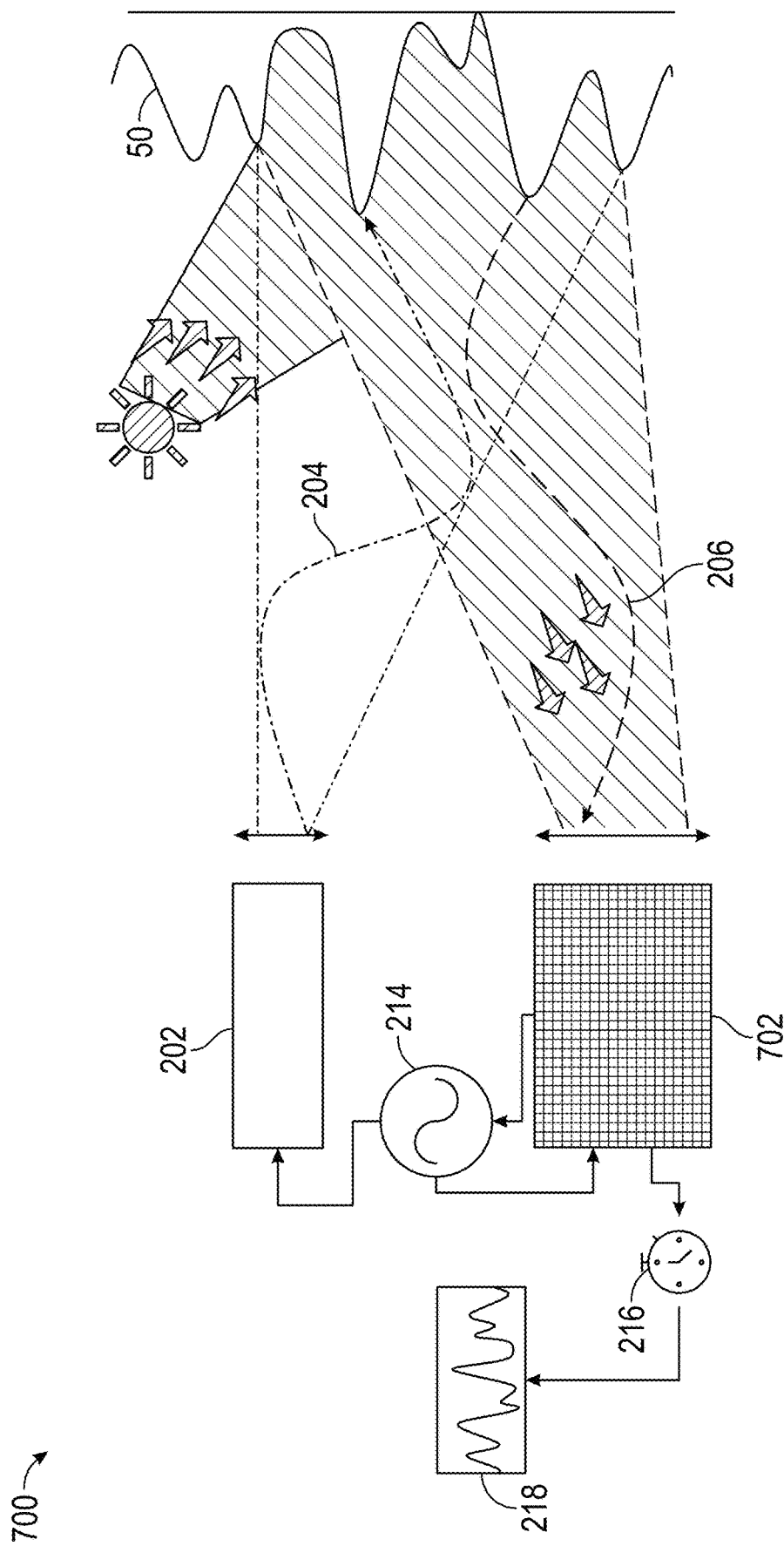
FIG. 7 shows a schematic diagram of an imaging system in an alternate embodiment.

FIG. 7 shows a schematic diagram of an imaging system 700 in an alternate embodiment. The imaging system 700 includes the light source 202 and a modulated receiver 702. The light source 202 generates an AMCW source signal 204 which is reflected from an object 50 within the scene to generate a reflected signal 206. The reflected signal 206 is received at modulated receiver 702. The modulated receiver 702 includes a modulated sensor array in which readout of a pixel can be controlled by changing a quantum efficiency of the pixel, as shown in FIG. 8.

FIG. 8 shows a pixel 800 of the modulated sensor array, in an embodiment. The pixel includes a PN junction having a depletion layer 802 with an N-region 804 at one end of the depletion layer and a P-region 806 at an opposite end of the depletion layer. The quantum efficiency of the pixel 800 is a measure of a responsiveness of the pixel to incoming light and is determined by the width of the depletion layer 802. The larger the depletion layer 802, the higher the quantum efficiency. The smaller the depletion layer, the lower the quantum efficiency.

The width of the depletion layer 802 is controlled by application of a reverse bias voltage 808. As the reverse bias voltage 808 is increased, the depletion layer 802 increases in size, making the pixel 800 more responsive to incoming light. As the reverse bias voltage 808 is decreased, the depletion layer 802 decreases in size, making the pixel 800 less responsive to incoming light.

FIG. 9 shows a graph 900 of quantum efficiency for PN-junctions having different doping concentrations. Reverse bias voltage is shown along the abscissa and quantum efficiency (QE) is shown along the ordinate axis. Each quantum efficiency curve shows an increase as the reverse bias is increases. The reverse bias voltage can be increased in order to increase the quantum efficiency of the pixel, as shown, for example, by QE curve 902. At a large enough reverse bias voltage, the QE curve 902 rises above a readout threshold 904. The readout period of the pixel can therefore be controlled by adjusting the reverse bias voltage appropriately.

Returning now to FIG. 7, system controller 214 synchronizes operation of the light source 202 and modulated receiver 702. The system controller 214 controls the reverse bias voltage at each row of the sensor array in order to readout rows sequentially, as shown in FIG. 4. The signal processor 216 then determines phase delay and amplitude values of the signal row amplitudes and the image processor 218 determines a depth and/or image of the object, giving a three-dimensional image of the object.

Figure 10:
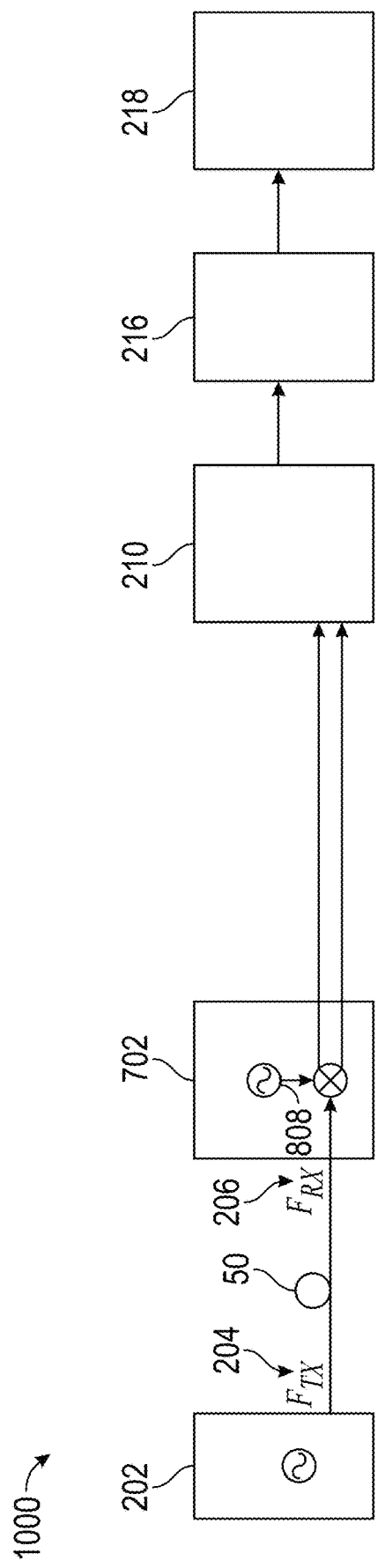
FIG. 10 shows a block diagram illustrating operation of the alternate imaging system.

FIG. 10 shows a block diagram 1000 illustrating operation of the alternate imaging system 700 of FIG. 7. The block diagram 1000 includes the light source 202, sensor array 210, signal processor 216 and image processor 218 as well as the modulated receiver 702.

The light source 202 generates the source signal 204 having a waveform $F_{TX}$ given by Eq. (13):

$$F_{TX} = P \cdot [\cos(2\pi f_s t - \phi_0) + 1] \quad \text{Eq. (13)}$$

where P is the original power of the source signal 204, $f_s$ is the frequency of the source signal, and $\phi_0$ is the original phase of the source signal. A reflected signal 206 created by reflection of the source signal 204 from the environment or object 50 is incident at the receiver 208. The reflected signal 206 received at selected pixel (n, m) of the modulated receiver 702 has a waveform $F_{RX}^{n,m}$ in given by Eq. (14):

$$F_{RX}^{n,m} = A_{n,m} \cdot [\cos(2\pi f_s (t - t_d^{n,m}) - \phi_0) B_{n,m}] \quad \text{Eq. (14)}$$

where $B_{n,m}$ is an amplitude of an oscillation of the reflected signal 206 at the modulated receiver 702 and $B_{n,m}$ is related to an average power of the reflected signal 206. The reverse bias voltage 808 of the modulated receiver 702 is modulated to control the quantum efficiency of the pixels. The modulation function for the reverse bias voltage 80 and thus for the quantum efficiency is given by Eq. (15):

$$F_{MIX} = \frac{1}{2} \cdot [\cos(2\pi f_{MIX} t) + 1] \quad \text{Eq. (15)}$$

where $f_{MIX}$ is the frequency of modulation. The mixing frequency $f_{MIX}$ is selected to be close to the frequency of the source signal $f_s$, both of which are in the Megahertz range. The difference $\Delta f$ between the mixing frequency and the frequency of the source signal is given by Eq. (16):

$$f_{MIX} = f_s - \Delta f \quad \text{Eq. (16)}$$

and is generally in the range of kilohertz. The modulation of the quantum efficiency of the pixels generates a down-converted signal or a signal having a lower frequency. The main component of the down-converted mixed signal $F_{IN}$ received at the sensor array 210 is shown in Eq. (17):

$$F_{IN}^{n,m} = \frac{A_{n,m}}{4} \cdot \cos(2\pi \Delta f t - \phi_d^{n,m} - \phi_0) \quad \text{Eq. (17)}$$

Information about the object is held in the various parameters of the waveform recorded at the sensor array 210. For example, the phase term $\phi_d^{n,m}$ holds information about a depth of the object and intensity measurements at the pixel (n, m) helps determined reflectance of the object.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of determining a range of an object at a vehicle, comprising:
    transmitting a source signal from the vehicle at a source frequency at the object, wherein the source signal is reflected from the object to create a reflected signal;
    modulating, via a modulator, the reflected signal using a mixing frequency to form a down-converted signal, wherein the modulator includes a sensor array comprising a pixel that includes a depletion layer of a PN-junction, and wherein modulating the reflected signal comprises controlling a voltage applied to the depletion layer;
    recording the down-converted signal at a sensor array of the vehicle; and
    determining the range of the object to the vehicle using the down-converted signal.

2. The method of claim 1, wherein modulating the reflected signal comprises modulating an intensity of the reflected signal at the mixing frequency using a modulator between the object and the sensor array.

3. The method of claim 1, further comprising recording the down-converted signal at a pixel cell comprising four rows, each row having four pixels.

4. The method of claim 3, further comprising binning the four pixels of each of the four rows to obtain four binned pixels, each binned pixel having a row signal amplitude and a time stamp.

5. The method of claim 4, further comprising determining at least one of: (i) a phase of the reflected signal from the row signal amplitudes; and (ii) an amplitude of the reflected signal from the row signal amplitudes.

6. The method of claim 5, further comprising determining a time-of-flight of the reflected signal and a range to the object from the time-of-flight.

7. An imaging system of a vehicle, comprising:
    a light source configured to transmit a source signal at a source frequency at an object, wherein the source signal is reflected from the object to create a reflected signal;
    a receiver having a sensor array, the receiver configured to modulate the reflected signal at a mixing frequency to generate a down-converted signal and record the down-converted signal at the sensor array, wherein the sensor array includes a pixel comprising a depletion layer of a PN-junction, and wherein modulating the reflected signal comprises controlling a voltage applied to the depletion layer; and
    a processor configured to determine a range of the object to the vehicle using the down-converted signal.

8. The imaging system of claim 7, further comprising a modulator configured to modulate an intensity of the reflected signal at the mixing frequency to generate the down-converted signal.

9. The imaging system of claim 7, wherein the processor is further configured to generate a pixel cell comprising four rows, each row having four pixels, and record the down-converted signal using the pixel cell.

10. The imaging system of claim 9, wherein the processor is further configured to bin the four pixels of each of the four rows to obtain four binned pixels, each binned pixel having a row signal amplitude and a time stamp.

11. The imaging system of claim 10, wherein the processor is further configured to determine at least one of: (i) a phase of the reflected signal from the row signal amplitudes; and (ii) an amplitude of the reflected signal from the row signal amplitudes.

12. The imaging system of claim 11, wherein the processor is further configured to determine a time-of-flight of the down-converted signal and a range to the object from the time-of-flight.

13. A vehicle, comprising:
    a light source configured to transmit a source signal at a source frequency at an object, wherein the source signal is reflected from the object to create a reflected signal;
    a receiver having a sensor array, the receiver configured to modulate the reflected signal at a mixing frequency to generate a down-converted signal and record the down-converted signal at the sensor array, wherein the sensor array includes a pixel comprising a depletion layer of a PN-junction, and wherein modulating the reflected signal comprises controlling a voltage applied to the depletion layer; and
    a processor configured to determine a range of the object using the down-converted signal.

14. The vehicle of claim 13, further comprising a modulator configured to modulate an intensity of the reflected signal at the mixing frequency to generate the down-converted signal.

15. The vehicle of claim 13, wherein the processor is further configured to generate a pixel cell comprising four rows, each row having four pixels, and record the down-converted signal using the pixel cell.

16. The vehicle of claim 15, wherein the processor is further configured to bin the four pixels of each of the four rows to obtain four binned pixels, each binned pixel having a row signal amplitude and a time stamp.

17. The vehicle of claim 16, wherein the processor is further configured to determine at least one of: (i) a phase of the reflected signal from the row signal amplitudes; and (ii) an amplitude of the reflected signal from the row signal amplitudes.

* * * * *